United States Patent
Pierpont et al.

(10) Patent No.: US 8,176,737 B2
(45) Date of Patent: May 15, 2012

(54) EXHAUST SYSTEM HAVING 3-WAY VALVE

(75) Inventors: David Andrew Pierpont, Dunlap, IL (US); John Parker Timmons, Chillicothe, IL (US); William L. Easley, Jr., Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 807 days.

(21) Appl. No.: 12/222,010

(22) Filed: Jul. 31, 2008

(65) Prior Publication Data

US 2010/0024417 A1 Feb. 4, 2010

(51) Int. Cl.
F02B 37/16 (2006.01)
(52) U.S. Cl. ............... 60/605.2; 60/612; 137/625.47; 137/625.5; 137/872
(58) Field of Classification Search ............. 60/605.2, 60/602, 612; 137/625.47, 625.5, 872
See application file for complete search history.

(56) References Cited

U.S. PATENT DOCUMENTS

| | | | |
|---|---|---|---|
| 3,423,926 A | 1/1969 | Nancarrow et al. |
| 3,559,397 A | 2/1971 | Navarro |
| 4,177,006 A | 12/1979 | Nancarrow |
| 4,179,892 A | 12/1979 | Heydrich |
| 4,474,006 A | 10/1984 | Price et al. |
| 4,526,004 A | 7/1985 | French et al. |
| 4,544,326 A | 10/1985 | Nishiguchi et al. |
| 4,611,465 A | 9/1986 | Kato et al. |
| 5,069,194 A | 12/1991 | Deutschmann et al. |
| 5,146,754 A | 9/1992 | Jain et al. |
| 5,611,202 A | 3/1997 | Sumser et al. |
| 5,611,203 A | 3/1997 | Henderson et al. |
| 5,740,785 A | 4/1998 | Dickey et al. |
| 5,791,146 A | 8/1998 | Dungner |
| 5,794,445 A | 8/1998 | Dungner |
| 5,943,864 A | 8/1999 | Sumser et al. |
| 6,216,459 B1 | 4/2001 | Daudel et al. |
| 6,223,534 B1 | 5/2001 | Erdmann et al. |
| 6,237,335 B1 | 5/2001 | Lönnqvist |
| 6,269,643 B1 | 8/2001 | Schmidt et al. |
| 6,286,312 B1 | 9/2001 | Bertilsson |
| 6,321,537 B1 | 11/2001 | Coleman et al. |
| 6,324,847 B1 | 12/2001 | Pierpont |
| 6,412,279 B1 | 7/2002 | Coleman et al. |
| 6,418,721 B1 | 7/2002 | Coleman et al. |
| 6,422,222 B1 | 7/2002 | Arbeiter et al. |
| 6,460,519 B1 | 10/2002 | Pierpont |
| 6,470,864 B2 | 10/2002 | Kim et al. |

(Continued)

FOREIGN PATENT DOCUMENTS

WO WO 2006007936 A1 * 1/2006

*Primary Examiner* — Mary A Davis
(74) *Attorney, Agent, or Firm* — Finnegan, Henderson, Farabow, Garrett & Dunner LLP

(57) ABSTRACT

An exhaust system for a use with a combustion engine is provided. The exhaust system may have a first exhaust manifold, a second exhaust manifold, and an exhaust gas recirculation circuit. The exhaust system may also have a fixed geometry turbocharger with a first volute configured to receive exhaust from the first exhaust manifold, and a second volute configured to receive exhaust from the second exhaust manifold. The exhaust system may also have a recirculation control valve in fluid communication with the first exhaust manifold, the second exhaust manifold and the exhaust gas recirculation circuit. The recirculation control valve may have a valve element movable to selectively adjust a flow of exhaust in the exhaust gas recirculation circuit, the first volute, and the second volute.

24 Claims, 4 Drawing Sheets

U.S. PATENT DOCUMENTS

| | | |
|---|---|---|
| 6,484,499 B2 | 11/2002 | Coleman et al. |
| 6,672,061 B2 | 1/2004 | Schmid et al. |
| 6,675,782 B1 | 1/2004 | Persson |
| 6,694,735 B2 | 2/2004 | Sumser et al. |
| 6,715,288 B1 | 4/2004 | Engels et al. |
| 6,715,289 B2 | 4/2004 | Mader et al. |
| 6,751,956 B2 | 6/2004 | Mayer et al. |
| 6,871,642 B1 | 3/2005 | Osterwald |
| 6,877,492 B1 | 4/2005 | Osterwald |
| 6,918,251 B2 * | 7/2005 | Yanagisawa et al. ........ 60/605.2 |
| 7,013,879 B2 | 3/2006 | Brookshire et al. |
| 7,043,913 B2 | 5/2006 | Nishiyama et al. |
| 7,051,527 B2 | 5/2006 | Schmid et al. |
| 7,165,403 B2 | 1/2007 | Sun et al. |
| 7,165,540 B2 | 1/2007 | Brookshire et al. |
| 7,222,614 B2 | 5/2007 | Bryant |
| 7,287,378 B2 | 10/2007 | Chen et al. |
| 2004/0074480 A1 | 4/2004 | Chen et al. |
| 2005/0103013 A1 | 5/2005 | Brookshire et al. |
| 2006/0060173 A1 | 3/2006 | Wei et al. |
| 2006/0070382 A1 | 4/2006 | Karlsson |
| 2006/0123785 A1 | 6/2006 | Sundin et al. |
| 2006/0123787 A1 | 6/2006 | Gobert et al. |
| 2006/0123788 A1 | 6/2006 | Gobert et al. |
| 2006/0174621 A1 | 8/2006 | Chen et al. |
| 2007/0028901 A1 | 2/2007 | Watakabe et al. |
| 2007/0119171 A1 | 5/2007 | Boyapati et al. |
| 2007/0175215 A1 | 8/2007 | Rowells |
| 2007/0193270 A1 | 8/2007 | Roozenboom et al. |
| 2007/0193564 A1 | 8/2007 | Takahashi et al. |
| 2008/0000228 A1 | 1/2008 | Kieser |
| 2008/0000229 A1 | 1/2008 | Kuspert et al. |
| 2010/0229550 A1 * | 9/2010 | Kuspert et al. .................. 60/602 |

* cited by examiner

EXHAUST SYSTEM HAVING 3-WAY VALVE

TECHNICAL FIELD

The present disclosure is directed to an exhaust system and, more particularly, to an exhaust system having a 3-way valve that connects divided manifolds to an exhaust gas recirculation circuit.

BACKGROUND

Combustion engines such as diesel engines, gasoline engines, and gaseous fuel-powered engines are supplied with a mixture of air and fuel for combustion within the engine that generates a mechanical power output. In order to maximize the power output generated by this combustion process, the engine is often equipped with a divided exhaust manifold in fluid communication with a turbocharged air induction system.

The divided exhaust manifold increases engine power by helping to preserve exhaust pulse energy generated by the engine's combustion chambers. Preserving the exhaust pulse energy improves turbocharger operation, which results in a more efficient use of fuel. In addition, the turbocharged air induction system increases engine power by forcing more air into the combustion chambers than would otherwise be possible. This increased amount of air allows for enhanced fueling that further increases the power output generated by the engine.

In addition to the goal of maximizing engine power output and efficiency, it is desirable to simultaneously minimize exhaust emissions. That is, combustion engines exhaust a complex mixture of air pollutants as byproducts of the combustion process. And, due to increased attention on the environment, exhaust emission standards have become more stringent. The amount of pollutants emitted to the atmosphere from an engine can be regulated depending on the type of engine, size of engine, and/or class of engine.

One method that has been implemented by engine manufacturers to comply with the regulation of these exhaust emissions includes utilizing an exhaust gas recirculating (EGR) system. EGR systems operate by recirculating a portion of the exhaust produced by the engine back to the intake of the engine to mix with fresh combustion air. The resulting mixture has a lower combustion temperature and, subsequently, produces a reduced amount of regulated pollutants.

EGR systems require a certain level of backpressure in the exhaust system to push a desired amount of exhaust back to the intake of the engine. And, the backpressure needed for adequate operation of the EGR system varies with engine load. Although effective, utilizing exhaust backpressure to drive EGR can adversely affect turbocharger operation, thereby reducing the air compressing capability of the air induction system. The reduced air compressing capability may, in turn, reduce the engine's fuel economy and possibly the amount of power generated by the engine. Thus, a system is required that provides sufficient exhaust backpressure to drive EGR flow without adversely affecting turbocharger or engine operation.

U.S. Pat. No. 6,321,537 to Coleman et al. ("the '537 patent") discloses a combustion engine utilizing an EGR system and a divided exhaust manifold together with a turbocharged air induction system. Specifically, the '537 patent describes an internal combustion engine having a plurality of combustion cylinders and an intake manifold in common fluid communication with the combustion cylinders. A first exhaust manifold and a second exhaust manifold are separately coupled with the combustion cylinders. A first variable geometry turbine is associated with the first exhaust manifold, and a second variable geometry turbine is associated with the second exhaust manifold. The EGR system includes a 3-way valve assembly disposed in fluid communication between the first exhaust manifold, the second exhaust manifold, and the intake manifold. The valve includes an inlet fluidly coupled with an inlet of the first variable geometry turbine, a first outlet fluidly coupled with an inlet of the second variable geometry turbine, and a second outlet fluidly coupled with the intake manifold.

During operation of the combustion engine described in the '537 patent, exhaust flows in parallel from the first exhaust manifold to the first variable geometry turbine and from the first exhaust manifold to the valve assembly. Spent exhaust from the first variable geometry turbine is mixed with exhaust from the second exhaust manifold and fed to the second variable geometry turbine. Spent exhaust from the second variable geometry turbine is discharged to the ambient environment. The valve assembly is selectively actuated to control a flow of exhaust from the two outlets. Exhaust flowing from the first outlet mixes with exhaust from the second exhaust manifold and flows into the second variable geometry turbine. Exhaust from the second outlet is cooled and then mixed with combustion air. The mixture of combustion air and exhaust is then transported to the inlet manifold. Controlling the amount of exhaust gas which is transported to the intake manifold provides effective exhaust gas recirculation within the combustion engine. Moreover, controlling the flow of exhaust to the second variable geometry turbine utilizes energy from the exhaust which is not transported to the intake manifold to drive the second variable geometry turbine.

Although the system in the '537 patent may adequately control exhaust gas recirculation in a turbocharged engine, it may be less than optimal. Specifically, the variable geometry nature of the two separate turbochargers may increase the cost, complexity, and controllability of the system.

The disclosed exhaust system is directed to overcoming one or more of the problems set forth above and/or other problems of the prior art.

SUMMARY

In one aspect, the disclosure is directed toward an exhaust system for an engine. The exhaust system may include a first exhaust manifold configured to receive exhaust from the engine, a second exhaust manifold configured to receive exhaust from the engine in parallel with the first exhaust manifold, and an exhaust gas recirculation circuit. The exhaust system may also include a fixed geometry turbocharger with a first volute configured to receive exhaust from the first exhaust manifold, and a second volute configured to receive exhaust from the second exhaust manifold. The exhaust system may also include a recirculation control valve in fluid communication with the first exhaust manifold, the second exhaust manifold, and the exhaust gas recirculation circuit. The recirculation control valve may have a valve element movable to selectively adjust a flow of exhaust in the exhaust gas recirculation circuit, the first volute, and the second volute.

In another aspect, the disclosure is directed toward a method for controlling the pressure of exhaust gas in a recirculation circuit. The method may include receiving exhaust from a first plurality of combustion chambers and from a second plurality of combustion chambers. The method may also include directing exhaust received from the first plurality of combustion chambers through the recirculation circuit, and directing exhaust received from the first plurality of combustion chambers through a turbocharger to increase an exhaust pressure of the recirculation circuit. The method may further include selectively directing exhaust received from the first plurality of combustion chambers to mix with exhaust received from the second plurality of combustion chambers to form a mixed exhaust and to adjust an exhaust pressure of the recirculation circuit, and directing mixed exhaust through the turbocharger.

DETAILED DESCRIPTION

Figure 1:
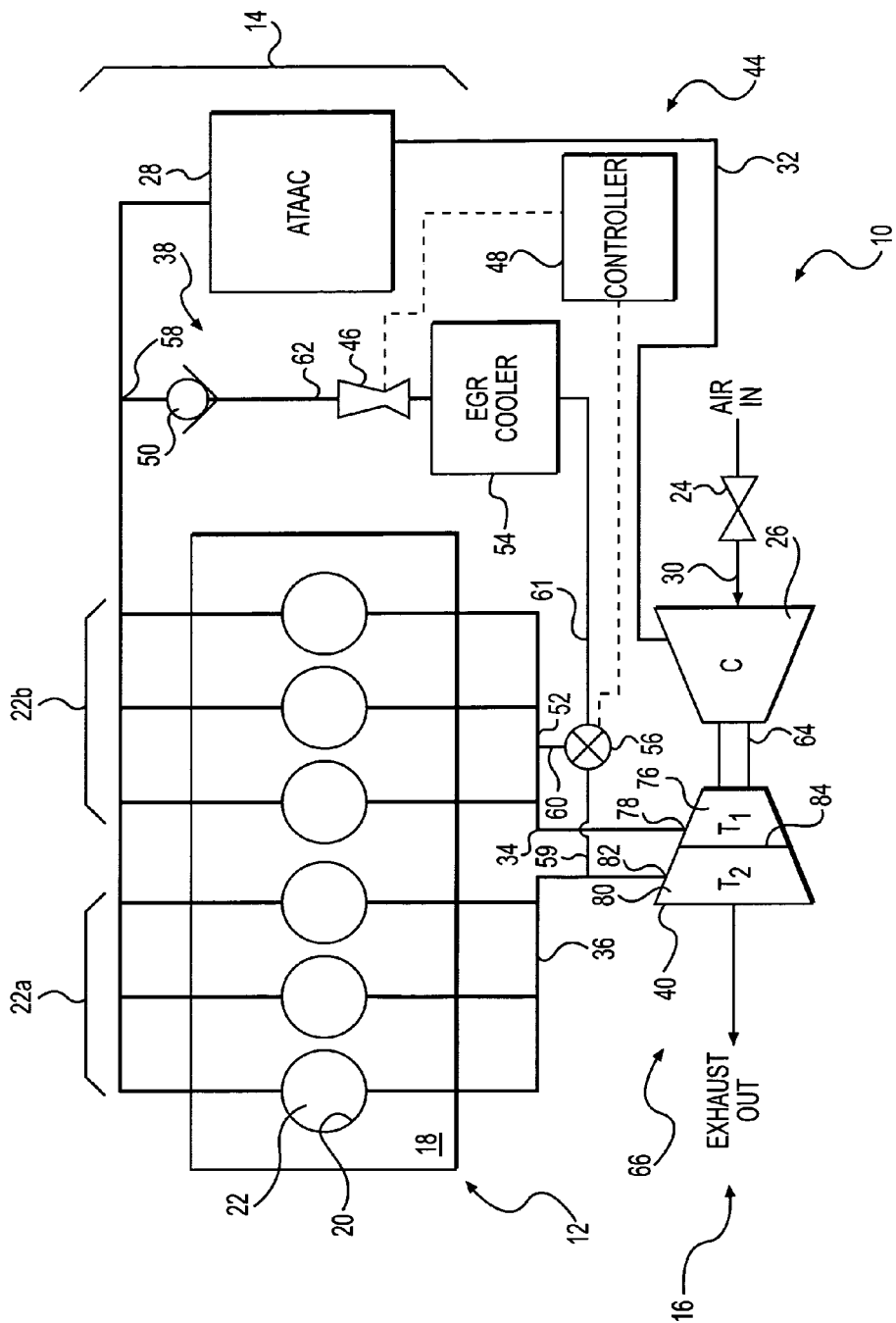
FIG. 1 is a diagrammatic illustration of an exemplary disclosed power system.

FIG. 1 illustrates a power system 10 having a power source 12, an air induction system 14, and an exhaust system 16. For the purposes of this disclosure, power source 12 is depicted and described as a four-stroke diesel engine. One skilled in the art will recognize, however, that power source 12 may be any other type of combustion engine such as, for example, a gasoline or a gaseous fuel-powered engine. Power source 12 may include an engine block 18 that at least partially defines a plurality of cylinders 20. A piston (not shown) may be slidably disposed within each cylinder 20 to reciprocate between a top-dead-center position and a bottom-dead-center position, and a cylinder head (not shown) may be associated with each cylinder 20. Cylinder 20, the piston, and the cylinder head may form a combustion chamber 22. In the illustrated embodiment, power source 12 includes six such combustion chambers 22. However, it is contemplated that power source 12 may include a greater or lesser number of combustion chambers 22 and that combustion chambers 22 may be disposed in an "in-line" configuration, a "V" configuration, or in any other suitable configuration.

Air induction system 14 may include components configured to introduce charged air into power source 12. For example, air induction system 14 may include an induction valve 24, one or more compressors 26, and an air cooler 28. Induction valve 24 may be connected upstream of compressor 26 via a fluid passageway 30 and configured to regulate a flow of atmospheric air to power source 12. Compressor 26 may embody a fixed geometry compressor configured to receive air from induction valve 24 and compress the air to a predetermined pressure level before it enters power source 12. Compressor 26 may be connected to power source 12 via a fluid passageway 32. Air cooler 28 may be disposed within fluid passageway 32, between power source 12 and compressor 26 and embody, for example, an air-to-air heat exchanger, an air-to-liquid heat exchanger, or a combination of both to facilitate the transfer of thermal energy to or from the compressed air directed into power source 12.

Exhaust system 16 may include components configured to direct exhaust from power source 12 to the atmosphere. Specifically, exhaust system 16 may include first and second exhaust manifolds 34 and 36 in fluid communication with combustion chambers 22, an exhaust gas recirculation (EGR) circuit 38 fluidly communicating first exhaust manifold 34 with air induction system 14, a turbine 40 associated with first and second exhaust manifolds 34, 36, and a control system 44 for regulating flows from exhaust system 16 to air induction system 14. It is contemplated that exhaust system 16 may include components in addition to those listed above such as, for example, particulate removing devices, constituent absorbers or reducers, and attenuation devices, if desired.

Exhaust produced during the combustion process within combustion chambers 22 may exit power source 12 via either first exhaust manifold 34 or second exhaust manifold 36. First exhaust manifold 34 may fluidly connect a first plurality 22a of combustion chambers 22 (e.g., the first three combustion chambers 22 from the right shown in FIG. 1) to turbine 40. Second exhaust manifold 36 may fluidly connect a second plurality 22b of combustion chambers 22 (e.g., the final three combustion chambers from the right shown in FIG. 1) to turbine 40.

EGR circuit 38 may include components that cooperate to redirect a portion of the exhaust produced by power source 12 from first exhaust manifold 34 to air induction system 14. Specifically, EGR circuit 38 may include an inlet port 52, a recirculation control valve 56, an EGR cooler 54, and a discharge port 58. Inlet port 52 may be fluidly connected to first exhaust manifold 34 upstream of turbine 40, and fluidly connected to recirculation control valve 56 via a passageway 60. Recirculation control valve 56 may further be fluidly connected to second exhaust manifold 36 via a passageway 59, and to EGR cooler 54 via a passageway 61. Discharge port 58 may receive exhaust from EGR cooler 54 via a fluid passageway 62, and discharge the exhaust to air induction system 14 at a location downstream of air cooler 28. It is contemplated that a check valve, for example a reed-type check valve 50 may be situated within fluid passageway 62 downstream of EGR cooler 54 at a location where exhaust mixes with inlet air to provide for a unidirectional flow of exhaust through EGR circuit 38 (i.e., to inhibit bidirectional exhaust flows through EGR circuit 38), if desired. It is also contemplated that check valve 50 may be omitted, if desired.

Figure 2:
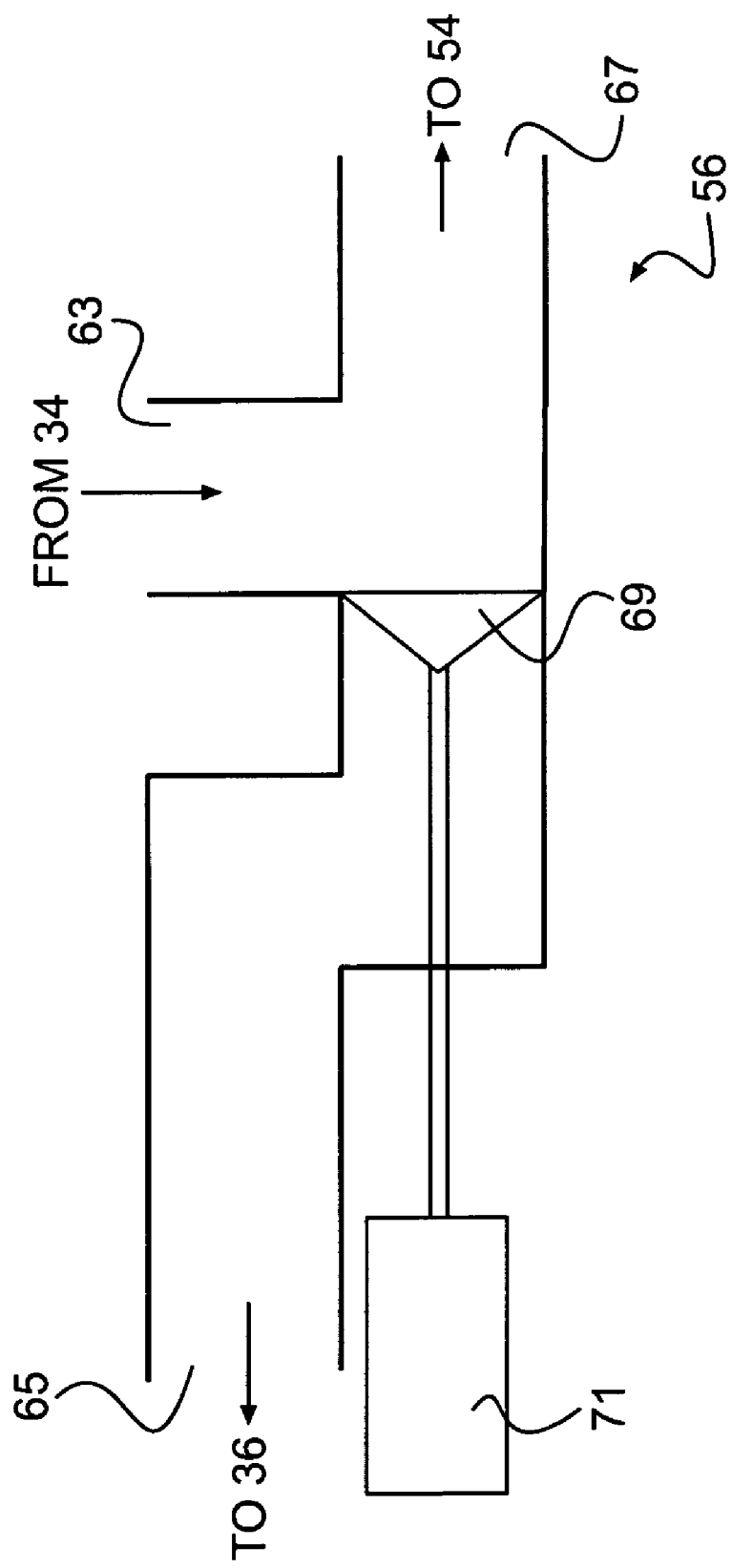
FIG. 2 is a diagrammatic illustration of an exemplary disclosed balance valve that may be used with the power system of FIG. 1.
Figure 3:
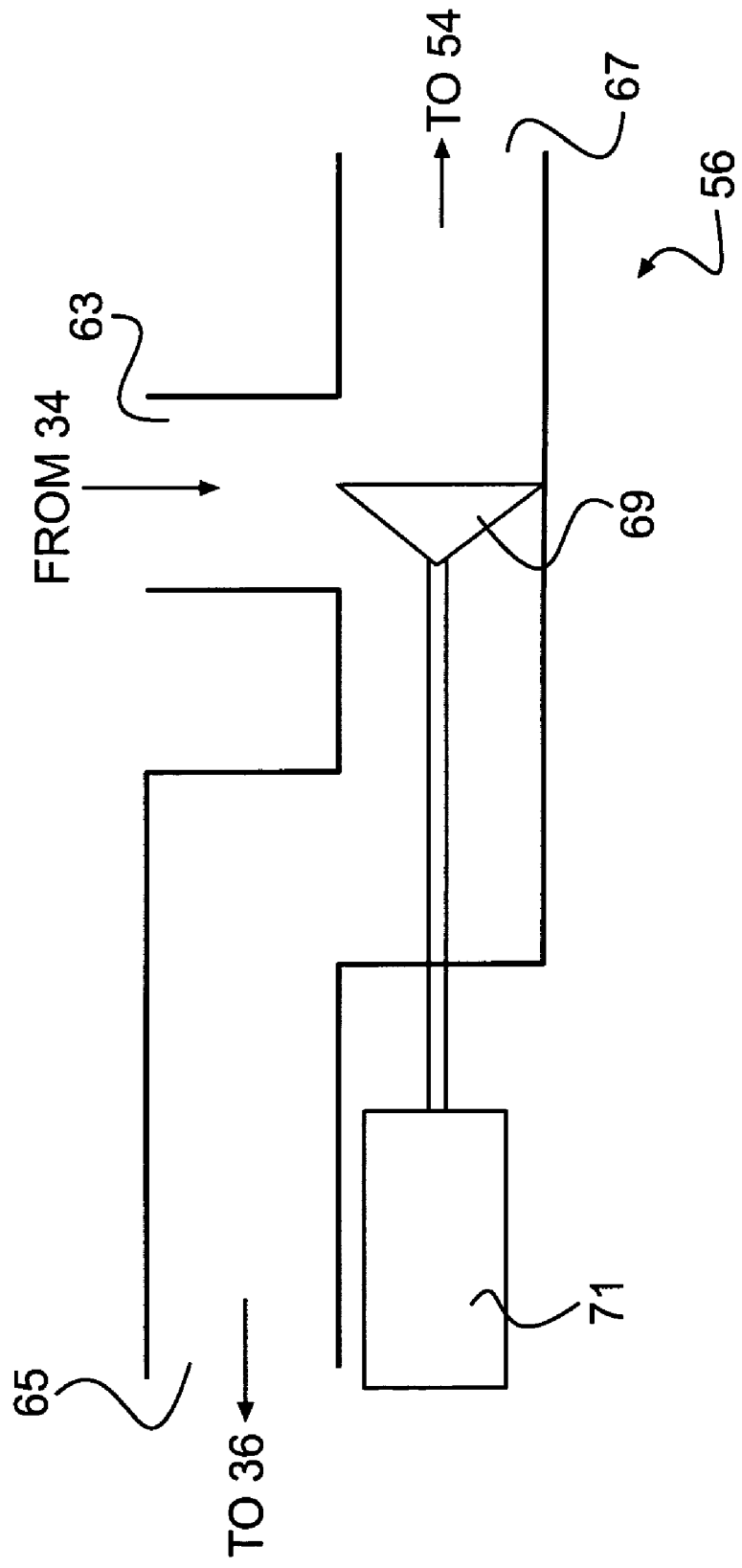
FIG. 3 is a diagrammatic illustration of the balance valve of FIG. 2 shown in a different position.
Figure 4:
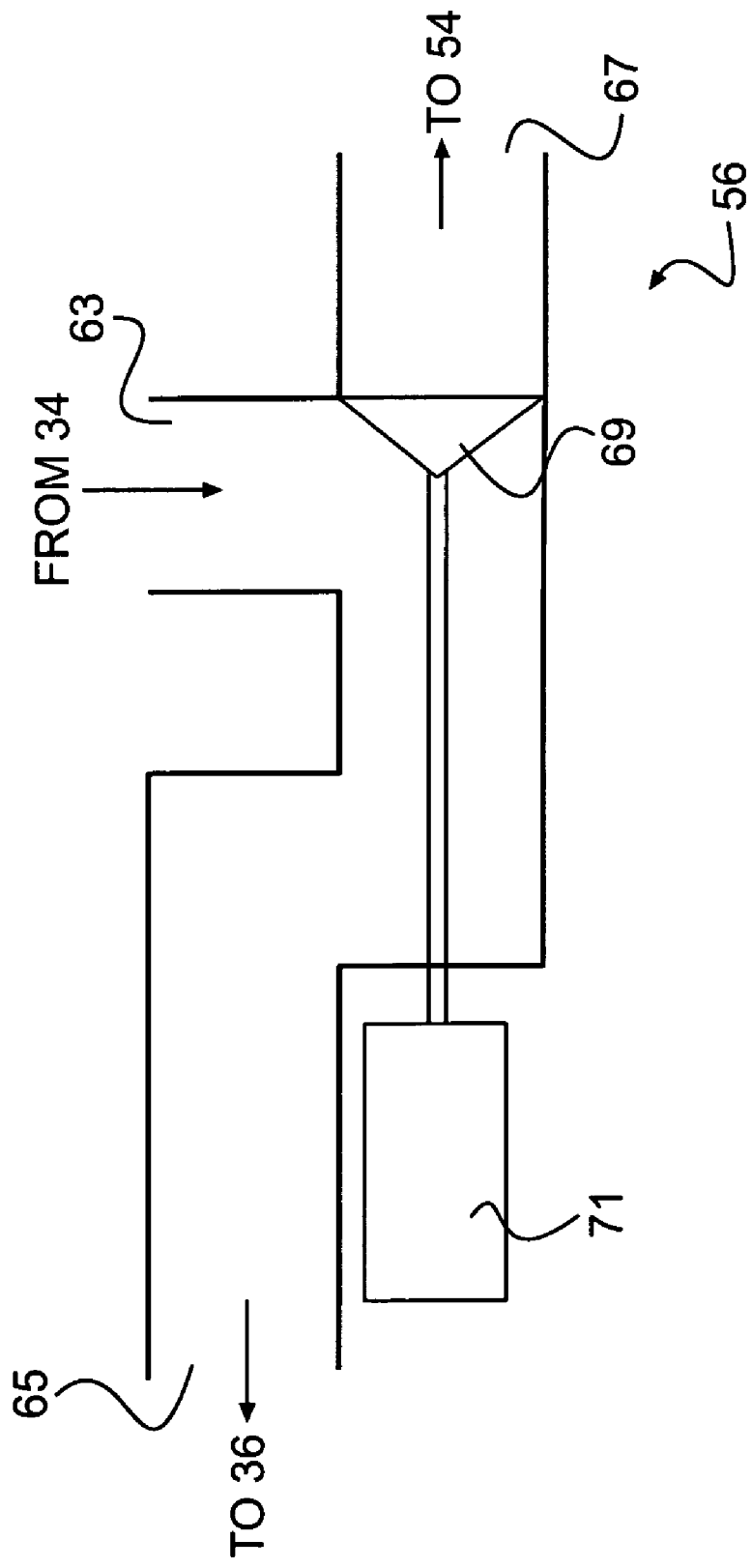
FIG. 4 is a diagrammatic illustration of the balance valve of FIGS. 2 and 3 shown in a different position.

Recirculation control valve 56 may be a 3-way, poppet-style, control valve. That is, as illustrated in FIG. 2, recirculation control valve 56 may have an inlet 63 in fluid communication with first exhaust manifold 34 via passageway 60, a first outlet 67 in fluid communication with EGR cooler 54 via passageway 61, a second outlet 65 in fluid communication with second exhaust manifold 36 via passageway 59, and a valve element 69 movable to affect exhaust flows from first and second outlets 65, 67. For example, valve element 69 may be movable from a first closed position (shown in FIG. 2) at which exhaust from first exhaust manifold 34 received via passageway 60 may be allowed to pass to only EGR cooler 54 (i.e., exhaust flow to second exhaust manifold 36 may be blocked when valve element 69 is in the first closed position), toward an open position (shown in FIG. 3) at which exhaust received from first exhaust manifold 34 via passageway 60 may be allowed to pass to both EGR circuit 38 and to second exhaust manifold 36 substantially unrestricted, and to a second closed position (shown in FIG. 4) at which exhaust from first exhaust manifold 34 may be allowed to pass to only second exhaust manifold 36 (i.e., exhaust flow to EGR circuit 38 may be blocked when valve element 69 is in the second closed position). Valve element 69 may be normally biased toward the first or the second closed position by way of a return spring (not shown). In some embodiments, recirculation control valve 56 may be a proportional valve, wherein valve element 69 may be moved to any position between the first closed, open, and second closed positions to allow partially restricted flows of exhaust to second exhaust manifold 36 (i.e., the restriction on the flow of exhaust from first exhaust manifold 34 to second exhaust manifold 36 may be infinitely changeable to adjust a flow rate of exhaust through EGR circuit 38) and to EGR circuit 38, if desired. Recirculation control valve 56 may be operated by an actuator 71, for example a solenoid-actuator, a hydraulic actuator, a pneumatic actuator or any other type of actuator to selectively restrict or completely block the flow of exhaust to second exhaust manifold 36 or to EGR circuit 38. Although not shown, it is contemplated that recirculation control valve 56 may be cooled, for example liquid cooled, if desired. It is further contemplated that recirculation control valve 56 may be integral with turbine 40, if desired.

Recirculation control valve 56 may regulate the recirculation of exhaust through EGR circuit 38 by selectively adjusting the pressure of exhaust flowing through first exhaust manifold 34. That is, when exhaust flows from first exhaust manifold 34 to second exhaust manifold 36 by way of recirculation valve 56, a pressure within first exhaust manifold 34 may be reduced and, as a result, an amount of exhaust passing from first exhaust manifold 34 through EGR circuit 38 may be reduced proportionally.

EGR cooler 54 (referring back to FIG. 1) may be configured to cool exhaust flowing through EGR circuit 38 and, subsequently, components within EGR circuit 38. EGR cooler 54 may include a liquid-to-air heat exchanger, an air-to-air heat exchanger, or any other type of heat exchanger known in the art for cooling an exhaust flow.

Turbine 40 may be a fixed geometry turbine configured to drive compressor 26. For example, turbine 40 may be directly and mechanically connected to compressor 26 by way of a shaft 64 to form a fixed geometry turbocharger 66. As the hot exhaust gases exiting power source 12 move through turbine 40 and expand against blades (not shown) therein, turbine 40 may rotate and drive the connected compressor 26 to pressurize inlet air.

Turbine 40 may include a divided housing having a first volute 76 with a first inlet 78 fluidly connected to first exhaust manifold 34, and a second volute 80 with a second inlet 82 fluidly connected to second exhaust manifold 36 (i.e., turbocharger 66 may have dual volutes). A wall member 84 may divide first volute 76 from second volute 80. It should be understood that at least a part of first volute 76 and/or first inlet 78 may have a smaller cross-sectional area, volume, and/or area/radius of curvature (A/R) ratio than second volute 80 and/or second inlet 82. The smaller cross-sectional area, volume, or A/R ratio may help restrict the flow of exhaust through first exhaust manifold 34, thereby creating backpressure sufficient to direct at least a portion of the exhaust from first exhaust manifold 34 through EGR circuit 38 by way of recirculation control valve 56.

Control system 44 may include components that function to regulate the flow rate and pressure of exhaust passing though first volute 76 and, subsequently the flow rate and pressure of exhaust passing through EGR circuit 38 and second volute 80 by adjusting recirculation control valve 56 in response to sensory input. Specifically, control system 44 may include a sensor 46, and a controller 48 in communication with sensor 46 and recirculation control valve 56. Based on signals received from sensor 46, controller 48 may adjust a restriction provided by recirculation control valve 56.

Although shown as located downstream of EGR cooler 54 and recirculation control valve 56, sensor 46 may alternatively be located anywhere within EGR circuit 38 and embody, for example, a mass air flow sensor such as a hot wire anemometer or a venturi-type sensor configured to sense pressure and/or a flow rate of exhaust passing through EGR circuit 38. Controller 48 may use signals produced by sensor 46 to determine and/or adjust a backpressure within first exhaust manifold 34 such that a desired amount of exhaust is recirculated back into power source 12 for subsequent combustion. This adjustment of pressure will be further explained in more detail below.

Controller 48 may embody a single or multiple microprocessors, field programmable gate arrays (FPGAs), digital signal processors (DSPs), etc. that include a means for controlling an operation of power system 10 in response to signals received from sensor 46. Numerous commercially available microprocessors can be configured to perform the functions of controller 48. It should be appreciated that controller 48 could readily embody a microprocessor separate from that controlling other non-exhaust related power system functions, or that controller 48 could be integral with a general power system microprocessor and be capable of controlling numerous power system functions and modes of operation. If separate from a general power system microprocessor, controller 48 may communicate with the general power system microprocessor via data links or other methods. Various other known circuits may be associated with controller 48, including power supply circuitry, signal-conditioning circuitry, actuator driver circuitry (i.e., circuitry powering solenoids, motors, or piezo actuators), communication circuitry, and other appropriate circuitry.

Before regulating the flow of exhaust through EGR circuit 38, controller 48 may first receive data indicative of an operational condition of power source 12 or a desired exhaust flow rate and/or pressure of EGR circuit 38. Such data may be received from another controller or computer (not shown). In an alternative embodiment, operational condition data may be received from sensors strategically located throughout power system 10. Controller 48 may then utilize stored algorithms, equations, subroutines, look-up maps, and/or tables to analyze the operational condition data and determine a corresponding desired exhaust pressure and/or flow rate of EGR circuit 38.

Controller 48 may also receive signals from sensor 46 indicative of the flow rate or pressure of exhaust passing through first exhaust manifold 34. Upon receiving input signals from sensor 46, controller 48 may perform a plurality of operations utilizing stored algorithms, equations, subroutines, look-up maps and/or tables to determine whether the flow rate or pressure of exhaust flowing through first exhaust manifold 34 is within a desired range for producing the desired exhaust flow rate and/or pressure within EGR circuit 38. In an alternate embodiment, it is contemplated that controller 48 may receive signals from various sensors (not shown) located throughout exhaust system 16 and/or power system 10 instead of sensor 46. Such sensors may sense parameters that may be used to calculate the flow rate or pressure of exhaust flowing through first exhaust manifold 34, if desired.

Based on the comparison of the actual EGR flow rate and/or pressure with the desired range of flow rates and/or pressures, controller 48 may adjust operation of exhaust system 16. That is, controller 48 may adjust operation of recirculation control valve 56 to affect the pressure within first exhaust manifold 34 and the resulting flow rates of exhaust through EGR circuit 38, first volute 76, and second volute 80. To increase the flow rate and pressure of exhaust passing through first volute 76 and EGR circuit 38, and to simultaneously decrease the flow rates and pressures of exhaust passing through second volute 80, valve element 69 of recirculation control valve 56 may moved toward the first closed position. To decrease the flow rate and pressure of exhaust passing through first volute 76 and EGR circuit 38, and to simultaneously increase the flow rates and pressures of exhaust passing through second volute 80, valve element 69 may be moved toward the second closed position.

INDUSTRIAL APPLICABILITY

The disclosed exhaust system may be implemented into any power system application where charged air induction and exhaust gas recirculation are utilized. The disclosed exhaust system may be inexpensive, simple, and offer high durability. Specifically, the fixed geometry nature of turbocharger 66 may decrease the complexity and cost of the disclosed exhaust system, while recirculation control valve 56 helps to maintain precision and controllability. In addition, the location of sensor 46 and check valve 50 downstream of EGR cooler 54 may result in cooler operating temperatures of those components and extended component lives. Further, the use of check valve 50 may enhance turbocharger stability and efficiency. Finally, by utilizing direct flow sensing and feedback control, precise regulation of exhaust gas recirculation may be possible.

It will be apparent to those skilled in the art that various modifications and variations can be made to the disclosed exhaust system. Other embodiments will be apparent to those skilled in the art from consideration of the specification and practice of the disclosed exhaust system. It is intended that the specification and examples be considered as exemplary only, with a true scope being indicated by the following claims and their equivalents.

What is claimed is:

1. An exhaust system for an engine, comprising:
   a first exhaust manifold configured to receive exhaust from the engine;
   a second exhaust manifold configured to receive exhaust from the engine in parallel with the first exhaust manifold;
   an exhaust gas recirculation circuit;
   a fixed geometry turbocharger having a first volute configured to receive exhaust from the first exhaust manifold, and a second volute configured to receive exhaust from the second exhaust manifold; and
   a recirculation control valve in fluid communication with the first exhaust manifold, the second exhaust manifold, and the exhaust gas recirculation circuit, the recirculation control valve having a valve element movable to selectively adjust a flow of exhaust in the first and second volute, while directing an additional flow from the recirculation control valve to the exhaust gas recirculation circuit, the valve element having a closed position blocking the additional flow from passing to the exhaust gas recirculation circuit.

2. The exhaust system of claim 1, wherein the valve element is movable to selectively allow exhaust entering the recirculation control valve from the first exhaust manifold to pass to only the exhaust gas recirculation circuit, to allow exhaust entering the recirculation control valve from the first exhaust manifold to pass to both the exhaust gas recirculation circuit and the second exhaust manifold, or to allow exhaust entering the recirculation control valve from the first exhaust manifold to pass to only the second exhaust manifold.

3. The exhaust system of claim 1, wherein the recirculation control valve is a proportional control valve and the valve element is selectively movable to adjust a flow restriction on exhaust passing through the second exhaust manifold and the exhaust gas recirculation circuit simultaneously.

4. The exhaust system of claim 3, wherein a flow restriction adjustment affects a flow rate of exhaust passing to the exhaust gas recirculation circuit.

5. The exhaust system of claim 1, wherein the valve element is a normally closed element biased to allow exhaust from the first exhaust manifold to pass to only the exhaust gas recirculation circuit.

6. The exhaust system of claim 5, wherein a greater opening of the valve element results in less exhaust passing through the exhaust gas recirculation circuit.

7. The exhaust system of claim 1, wherein exhaust from the first exhaust manifold passing through the recirculation control valve mixes with exhaust from the second exhaust manifold before passing through the turbocharger.

8. The exhaust system of claim 1, wherein the recirculation control valve is separate from the turbocharger.

9. The exhaust system of claim 1, wherein the first volute has a greater restriction than the second volute to drive exhaust flow through the exhaust gas recirculation circuit.

10. The exhaust system of claim 1, further including a cooler located within the exhaust gas recirculation circuit downstream of the recirculation control valve.

11. The exhaust system of claim 10, further including a flow sensor located within the exhaust gas recirculation circuit downstream of the cooler.

12. The exhaust system of claim 10, further including a check valve located within the exhaust gas recirculation circuit downstream of the cooler at a location where exhaust mixes with ambient air.

13. The exhaust system of claim 1, the valve element having an open position, wherein moving the valve element from the open position toward the closed position simultaneously increases a flow of exhaust from the first exhaust manifold to the second exhaust manifold and decreases a flow of the additional flow passing to the exhaust gas recirculation circuit.

14. A method for controlling the pressure of exhaust gas in a recirculation circuit, comprising:
   receiving exhaust from a first plurality of combustion chambers and from a second plurality of combustion chambers;
   directing exhaust received from the first plurality of combustion chambers, through a valve, to the recirculation circuit;
   directing exhaust received from the first plurality of combustion chambers through a first portion of a turbocharger to simultaneously increase an exhaust pressure of the recirculation circuit, increase a pressure of exhaust directed to the first portion, and decrease a pressure of exhaust directed to a second portion of the turbocharger;
   selectively directing exhaust received from the first plurality of combustion chambers through the valve to mix with exhaust received from the second plurality of combustion chambers, form a mixed exhaust, and adjust the exhaust pressure of the recirculation circuit; and
   directing the mixed exhaust through the turbocharger without passing the mixed exhaust through the recirculation circuit.

15. The method of claim 14, further including selectively adjusting an amount of exhaust directed through the recirculation circuit by changing a restriction on the exhaust directed to mix with exhaust received from the second plurality of combustion chambers.

16. The method of claim 15, wherein the restriction is infinitely changeable.

17. The method of claim 16, further including:
sensing the amount of exhaust directed through the recirculation circuit; and
changing the restriction based on the sensed amount.

18. The method of claim 15, wherein an increase in the restriction results in an increase in the amount of exhaust directed through the recirculation circuit.

19. The method of claim 14, wherein the pressure increase caused by exhaust received from the first plurality of combustion chambers being directed through the turbocharger drives exhaust through the recirculation circuit.

20. The method of claim 14, further including cooling the exhaust directed through the recirculation circuit.

21. The method of claim 14, wherein the first portion of the turbocharger receives exhaust from the first plurality of combustion chambers via a direct fluid connection extending from a first manifold fluidly connected to the first plurality of combustion chambers to the first portion, and wherein the mixed exhaust is directed through the second portion of the turbocharger.

22. The method of claim 14, further including increasing a pressure of the mixed exhaust with the valve while simultaneously decreasing the exhaust pressure of the recirculation circuit with the valve.

23. A power system, comprising:
a combustion engine having a first plurality of combustion chambers and a second plurality of combustion chambers;
a first exhaust manifold configured to receive exhaust from the first plurality of combustion chambers;
a second exhaust manifold configured to receive exhaust from the second plurality of combustion chambers in parallel with the first exhaust manifold;
an exhaust gas recirculation circuit;
a fixed geometry turbocharger having a first volute configured to receive exhaust from the first exhaust manifold, and a second volute configured to receive exhaust from the second exhaust manifold;
a proportional recirculation control valve in fluid communication with the first exhaust manifold, the second exhaust manifold, and the exhaust gas recirculation circuit, the proportional recirculation control valve having a single inlet, and a valve element movable to selectively adjust a flow of exhaust in the exhaust gas recirculation circuit, the first volute, and the second volute; and
a cooler located within the exhaust gas recirculation circuit downstream of the proportional recirculation control valve.

24. The power system of claim 23, further including a passage directing exhaust from the first exhaust manifold to the first volute without passing through the proportional recirculation control valve.

* * * * *